United States Patent
Tsuchida et al.

(10) Patent No.: US 12,076,942 B2
(45) Date of Patent: Sep. 3, 2024

(54) METHOD FOR MANUFACTURING FIBER-REINFORCED RESIN BOLT AND FIBER-REINFORCED RESIN BOLT

(71) Applicant: TAKAI CORPORATION, Gifu (JP)

(72) Inventors: Kenji Tsuchida, Gifu (JP); Yasuhiro Furuta, Gifu (JP)

(73) Assignee: TAKAI CORPORATION, Gifu (JP)

( * ) Notice: Subject to any disclaimer, the term of this patent is extended or adjusted under 35 U.S.C. 154(b) by 1025 days.

(21) Appl. No.: 16/961,691

(22) PCT Filed: Jan. 11, 2019

(86) PCT No.: PCT/JP2019/000777
§ 371 (c)(1),
(2) Date: Jul. 12, 2020

(87) PCT Pub. No.: WO2019/139149
PCT Pub. Date: Jul. 18, 2019

(65) Prior Publication Data
US 2021/0025428 A1 Jan. 28, 2021

(30) Foreign Application Priority Data
Jan. 11, 2018 (JP) ................. 2018-002619

(51) Int. Cl.
*F16B 35/04* (2006.01)
*B29C 70/08* (2006.01)
(Continued)

(52) U.S. Cl.
CPC ............ *B29C 70/083* (2013.01); *B29C 70/30* (2013.01); *B29C 70/48* (2013.01); *F16B 33/06* (2013.01);
(Continued)

(58) Field of Classification Search
CPC ..... B29L 1/002; B29K 2307/04; B29C 70/48; B29C 70/083
See application file for complete search history.

(56) References Cited

U.S. PATENT DOCUMENTS

| | | | | |
|---|---|---|---|---|
| 3,669,158 A | * | 6/1972 | Phillips | D03D 15/275 139/420 C |
| 4,017,348 A | * | 4/1977 | Shumaker | B29C 70/462 301/6.2 |

(Continued)

FOREIGN PATENT DOCUMENTS

| | | |
|---|---|---|
| FR | 2 380 459 A1 | 9/1978 |
| JP | 06-185514 A | 7/1994 |

(Continued)

OTHER PUBLICATIONS

Machine Translation of JP 06-185514 A dated Jul. 5, 1994.
(Continued)

*Primary Examiner* — Gary W Estremsky
(74) *Attorney, Agent, or Firm* — Hedman & Costigan, P.C.; James V. Costigan; Kathleen A. Costigan (57) ABSTRACT

Provided is a fiber-reinforced resin bolt having a strength higher than that of a conventional fiber-reinforced resin bolt. A fiber-reinforced resin bolt 1 formed by a winding step of winding a CFRP resin tape 14, which is formed in a band shape by integrating CFRP 12 with a thermosetting resin in such a manner that the CFRP 12 is oriented in a longitudinal direction, so that the CFRP 12 is arranged concentrically around a winding axis, thereby forming a CFRP resin tape layer 10; and a curing step of placing the CFRP resin tape layer 10 formed by the winding step in a die 40 whose inner wall surface is formed with a screw shape, pressurizing the die 40 in which the CFRP resin tape layer 10 is placed from one direction of the winding axis to the other, and heating (Continued)

the die 40 with a heater 82, thereby curing the resin containing the CFRP resin tape layer 10.

2 Claims, 8 Drawing Sheets

(51) Int. Cl.
    *B29C 70/30*     (2006.01)
    *B29C 70/48*     (2006.01)
    *F16B 33/06*     (2006.01)
    B29K 71/00     (2006.01)
    B29K 307/04     (2006.01)
    B29L 1/00     (2006.01)

(52) U.S. Cl.
    CPC ...... *B29K 2071/00* (2013.01); *B29K 2307/04* (2013.01); *B29L 2001/002* (2013.01)

(56) References Cited

U.S. PATENT DOCUMENTS

| | | | | |
|---|---|---|---|---|
| 4,063,838 A | * | 12/1977 | Michael | B29D 99/0046 411/908 |
| 4,620,401 A | * | 11/1986 | L'Esperance | E04C 5/07 411/908 |
| 4,717,302 A | * | 1/1988 | Adams | F16B 33/006 411/378 |
| 4,863,330 A | * | 9/1989 | Olez | B29C 70/14 411/908 |
| 5,033,925 A | * | 7/1991 | Moghe | F16B 33/006 411/908 |
| 5,080,547 A | * | 1/1992 | Moghe | B29C 70/085 411/908 |
| 8,613,580 B2 | * | 12/2013 | Hecht | F16B 33/006 411/908 |
| 9,555,588 B2 | * | 1/2017 | Hayden | B29C 70/86 |
| 10,792,873 B2 | * | 10/2020 | Pillay | B29D 1/005 |
| 2002/0056508 A1 | * | 5/2002 | Brandstrom | B29C 70/525 156/245 |
| 2010/0119299 A1 | * | 5/2010 | Montminy | F16B 33/006 156/173 |
| 2012/0063866 A1 | * | 3/2012 | Jeong | B29C 70/545 156/172 |
| 2013/0103359 A1 | * | 4/2013 | Grandine | G06F 30/00 703/1 |
| 2020/0378430 A1 | * | 12/2020 | Wakabayashi | F16B 37/00 |

FOREIGN PATENT DOCUMENTS

| | | |
|---|---|---|
| JP | 07-080857 A | 3/1995 |
| JP | 07 279933 A | 10/1995 |
| JP | 09-184440 A | 7/1997 |
| JP | 2003-201800 A | 7/2003 |
| JP | 2017 003091 A | 1/2017 |

OTHER PUBLICATIONS

Machine Translation of JP 09-184440 A dated Jul. 15, 1997.
Machine Translation of JP 2003-201800 A dated Jul. 18, 2003.
Machine Translation of JP 2017 003091 A dated Jan. 5, 2017.
Machine Translation of JP 07-279933 A dated Oct. 27, 1995.
Machine Translation of FR 2 380 459 A1 dated Sep. 8, 1978.
Supplementary European Search Report issued in the corresponding European Patent Application—mailed Aug. 30, 2021.
Machine translation of JP 07-080857 A dated Mar. 28, 1995.

* cited by examiner

| No. | Material | Tensile breaking load [N] |
|---|---|---|
| 1 | Carbon | 14346.3 |
| 2 | PENY | 6023.5 |
| 3 | PEEK | 3158.6 |

| Bolt type | | Carbon fiber content rate [%] | Resin content rate [%] | Tensile breaking load [N] |
|---|---|---|---|---|
| Fiber-reinforced resin bolt | Case 1 | 43.8 | 56.2 | 2030 |
| | Case 2 | 50.9 | 49.1 | 2370 |
| | Case 3 | 56.4 | 43.6 | 2042 |
| RENY | | --- | --- | 762 |
| PEEK | | --- | --- | 430 |

METHOD FOR MANUFACTURING FIBER-REINFORCED RESIN BOLT AND FIBER-REINFORCED RESIN BOLT

TECHNICAL FIELD

The present invention relates to a high-strength bolt including a reinforcing fiber and a resin material.

BACKGROUND ART

As a conventional fiber-reinforced resin bolt, there is a fiber-reinforced resin bolt obtained by press-forming a rod-shaped material obtained by incorporating, into a synthetic resin, long fibers of carbon fiber or the like in such a manner that the fibers are arranged in the longitudinal direction, wherein at least the long fibers in a straight part are arranged linearly along the axial direction at outer peripheral parts of the fiber-reinforced resin bolt and arranged in a bent shape at an axial center part thereof (for example, Patent Document 1).

PRIOR ART DOCUMENTS

Patent Document

Patent Document 1: JP H06-185514 A

SUMMARY OF THE INVENTION

Problems to be Solved by the Invention

However, the conventional fiber-reinforced resin bolt described above has a structure in which the long fibers in the straight part are linearly arranged along the axial direction at the outer peripheral parts and arranged in a bent shape at the axial center part, and thus involves a problem of insufficient strength as a bolt.

The present invention has been made in view of such a problem, and an object thereof is to provide a method for manufacturing a fiber-reinforced resin bolt having a strength higher than that of a conventional fiber-reinforced resin bolt, and a fiber-reinforced resin bolt.

Means for Solving the Problem

Application Example 1

A method for manufacturing a fiber-reinforced resin bolt according to the present invention includes forming a fiber-reinforced resin bolt (1) by:

a winding step of winding a reinforcing fiber resin tape (14), which is formed in a band shape by integrating a reinforcing fiber (12) with a resin in such a manner that the reinforcing fiber (12) is oriented in a longitudinal direction, so that the reinforcing fiber (12) is arranged concentrically around a winding axis, thereby forming a reinforcing fiber resin tape layer (10); and a curing step of placing the reinforcing fiber resin tape layer (10) formed by the winding step in a die (40) whose inner wall surface is formed with a screw shape, and pressurizing the reinforcing fiber resin tape layer (10) placed in the die (40) from one direction of the winding axis toward the other, thereby curing the resin of the reinforcing fiber resin tape layer (10).

In such a method for manufacturing a fiber-reinforced resin bolt, the reinforcing fiber resin tape (14) is wound concentrically around the winding axis to form the reinforcing fiber resin tape layer (10).

Then, in a state of being placed in the die (40), the formed reinforcing fiber resin tape layer (10) is pressurized from one direction of the winding axis toward the other to cure the resin of the reinforcing fiber resin tape layer (10) (curing step).

Here, upon pressurization of the reinforcing fiber resin tape layer (10), the reinforcing fiber layer extends spirally in the winding axis direction to form a reinforcing fiber layer (70).

The inner wall surface of the die (40) is formed with a screw shape, and the reinforcing fiber resin tape layer (10) is placed in the die (40) so that its winding axis is parallel to the inner wall surface formed with a screw shape. Therefore, when the resin is cured, a screw is formed on its outer wall surface.

The fiber-reinforced resin bolt (1) manufactured by such a manufacture method has, inside the cured resin, the reinforcing fiber layer (70) wound spirally around the winding axis.

When such a fiber-reinforced resin bolt (1) is used, axial tensile force and circumferential bending force are applied to the fiber-reinforced resin bolt (1). The tensile force and the bending force are received by the reinforcing fiber (12). Since the reinforcing fiber layer (70) is formed spirally, both the tensile force and the bending force are received by the reinforcing fiber (12).

Therefore, the fiber-reinforced resin bolt (1) can have a strength higher than that of a conventional bolt in which the reinforcing fiber is arranged only in the axial direction.

Application Example 2

The method for manufacturing a fiber-reinforced resin bolt according to Application Example 1 includes, after the winding step, a bending step of bending the reinforcing fiber resin tape layer (10) formed by the winding step with respect to an axis parallel to the winding axis.

According to such a method for manufacturing a fiber-reinforced resin bolt, the reinforcing fiber resin tape layer (10) formed by the winding step is further bent in an axis parallel to the winding axis by the bending step. Therefore, the formed reinforcing fiber resin tape layer (10) has a more multilayered structure, and thus it is possible to manufacture a fiber-reinforced resin bolt (1) having a higher strength.

Furthermore, even if the diameter of the reinforcing fiber resin tape layer (10) to be formed by winding is increased in the winding step, the reinforcing fiber resin tape layer (10) having an appropriate diameter can be formed by the subsequent bending step. Therefore, the winding step can be facilitated.

Application Example 3

A method for manufacturing a fiber-reinforced resin bolt according to the present invention includes forming a fiber-reinforced resin bolt (1) by:

a winding step of winding a reinforcing fiber tape (62), which is formed in a band shape in such a manner that a reinforcing fiber (12) is oriented in a longitudinal direction, so that the reinforcing fiber (12) is arranged concentrically around a winding axis, thereby forming a reinforcing fiber tape layer (60);

a resin injection step of placing the reinforcing fiber tape layer (60) formed by the winding step in a die (40) whose inner wall surface is formed with a screw shape, and injecting a resin into the die (40) in which the reinforcing fiber tape layer (60) is placed; and a curing step of pressurizing the die (40) into which the resin is injected by the resin injection step from one direction of the winding axis toward the other, thereby curing the resin containing the reinforcing fiber tape layer (60).

In such a method for manufacturing a fiber-reinforced resin bolt, the reinforcing fiber tape (62) is wound concentrically around the winding axis to form the reinforcing fiber tape layer (60).

Then, the formed reinforcing fiber tape layer (60) is placed in the die (40), and the resin is injected (resin injection step). The die (40) into which the resin is injected is pressurized from one direction of the winding axis to the other to cure the resin containing the reinforcing fiber tape layer (60) (curing step).

Here, the reinforcing fiber tape layer (60), when heated and pressurized, extends spirally in the winding axis direction. The inner wall surface of the die (40) is formed with a screw shape, and the reinforcing fiber tape layer (60) is placed in the die (40) so that its winding axis is parallel to the inner wall surface formed with a screw shape. Therefore, when the resin is cured, a screw is formed on its outer wall surface.

The fiber-reinforced resin bolt (1) manufactured by such a manufacture method can have a strength higher than that of a conventional bolt in which the reinforcing fiber is arranged only in the axial direction, similarly to the fiber-reinforced resin bolt (1) in Application Example 1.

Application Example 4

The method for manufacturing a fiber-reinforced resin bolt according to Application Example 3 includes, after the winding step, a bending step of bending the reinforcing fiber tape layer (60) formed by the winding step with respect to an axis parallel to the winding axis. The resin injection step includes placing the reinforcing fiber tape layer (60) formed by the bending step in a die (40) whose inner wall surface is formed with a screw shape, and injecting a resin into the die (40) in which the reinforcing fiber tape layer (60) is placed.

According to such a method for manufacturing a fiber-reinforced resin bolt, the same effect as that of Application Example 3 can be obtained.

Application Example 5

A fiber-reinforced resin bolt (1) according to the present invention includes:

a reinforcing fiber layer (70) in which a reinforcing fiber (12), which is formed in a band shape in such a manner that the fiber is oriented in a longitudinal direction, is formed in a state where the reinforcing fiber (12) is wound spirally around a central axis;

a resin layer (20) containing the reinforcing fiber layer (70); and a screw part (30) formed on an outer peripheral surface thereof by heating and pressurization in a state where the reinforcing fiber layer (70) is contained in the resin layer (20).

Such a fiber-reinforced resin bolt (1) can have a strength higher than that of a conventional bolt in which the reinforcing fiber is arranged only in the axial direction, similarly to the fiber-reinforced resin bolt (1) manufactured by the method for manufacturing a fiber-reinforced resin bolt according to Application Example 1.

Application Example 6

In the fiber-reinforced resin bolt (1) according to Application Example 3, the reinforcing fiber (12) is carbon fiber-reinforced plastic.

In such a fiber-reinforced resin bolt (1), carbon fiber-reinforced plastic is used as the reinforcing fiber (12). Thus, the fiber-reinforced resin bolt (1) can be lightweight and have a high strength.

MODE FOR CARRYING OUT THE INVENTION

Hereinafter, embodiments to which the present invention is applied will be described with reference to the drawings. It should be noted that the embodiments of the present invention are not limited to the following embodiments at all, and can take various forms within the technical scope of the present invention.

First Embodiment (Manufacture of Fiber-Reinforced Resin Bolt)

A method for manufacturing a fiber-reinforced resin bolt 1 (hereinafter, also referred to simply as "bolt 1") will be described with reference to FIGS. 1 to 4. In the present embodiment, carbon fiber-reinforced plastic (hereinafter, also referred to as "CFRP 12") is used as a reinforcing fiber 12.

Figure 1:
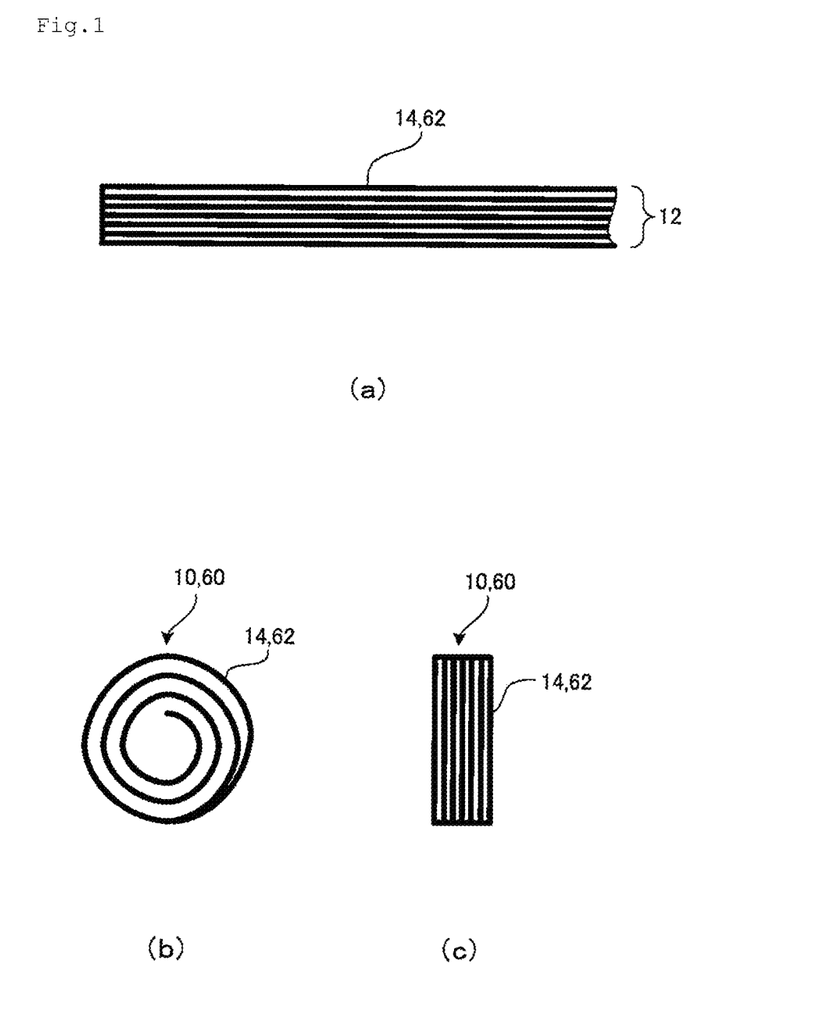
FIG. 1 is a schematic diagram showing a configuration of a CFRP resin tape, a CFRP tape, a CFRP resin tape layer and a CFRP tape layer.

First, as shown in FIG. 1(*a*), a CFRP resin tape 14, which is formed in a band shape by integrating CFRP 12 with a predetermined amount of resin in such a manner that the fiber is oriented in the longitudinal direction, is wound concentrically around a winding axis as shown in FIG. 1(*b*) (plan view) and FIG. 1(*c*) (side view), thereby forming a ring-shaped CFRP resin tape layer 10 (winding step). At this time, the CFRP resin tape 14 is wound around the winding axis with as little gap as possible.

Here, the phrase "integrating CFRP with a predetermined amount of resin" means that long fibers of CFRP are arranged in a band shape, immersed in the resin for solidification, and formed in a tape shape. The amounts of CFRP and resin at this time are the amount of CFRP necessary for attaining a predetermined strength of the bolt 1, and determined by the amount of resin necessary for forming a screw part 30 as the bolt 1 (amount of resin after winding) or the type of thermosetting resin.

In the present embodiment, a thermosetting resin such as vinyl ester is used as the resin. Furthermore, the proportions of the CFRP 12 and the thermosetting resin are 50% to 60% by weight and 50% to 40% by weight, respectively, and, particularly in the present embodiment, were set to 57% by weight for the CFRP 12 and 43% by weight for the thermosetting resin.

FIGS. 1(a) and 1(c) are conceptualized in order to show fibers of the CFRP 12. In FIG. 1(b), gaps are drawn larger than the actual size for easy understanding of the laminated state of the wound CFRP resin tape 14.

Next, electric power is supplied to a heater 82 of a die 40 to preheat the die 40 (about 90° C. in the case of vinyl ester) so as to attain a temperature lower than the curing temperature of the thermosetting resin.

Figure 2:
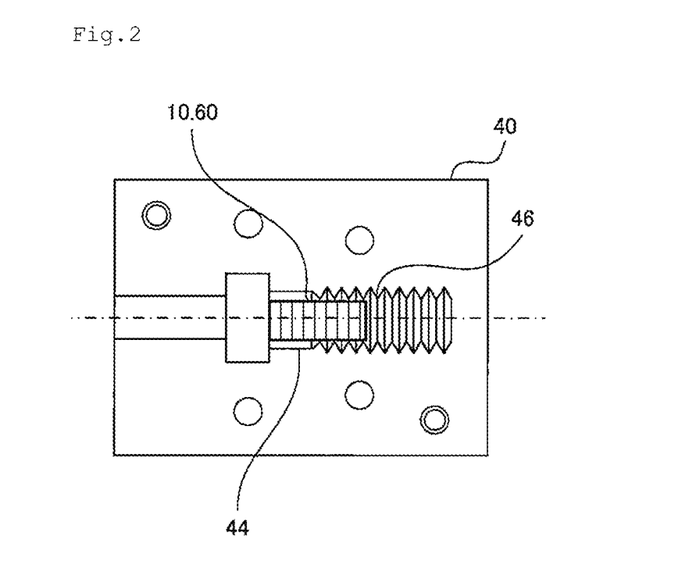
FIG. 2 is a diagram when a CFRP resin tape layer or CFRP tape layer formed in a ring shape is placed in a die.

Next, as shown in FIG. 2, the CFRP resin tape layer 10 formed in a ring shape is placed in a portion close to a cylindrical part 44 of a screw part 46 of the die 40 so that the winding axis substantially matches the axial direction of the screw part 46 of the die 40.

As shown in FIGS. 3(a) and 3(b), the die 40 has a shape formed by halving a metal block made of a SUS material or the like (one half is defined as a die 40a, and the other half is defined as a die 40b). The dies 40a and 40b can be integrated with a bolt 41 and a nut 42. In addition, the inner surfaces of the dies 40a and 40b each having a halved shape have an outer diameter shape of the bolt 1.

Figure 3:
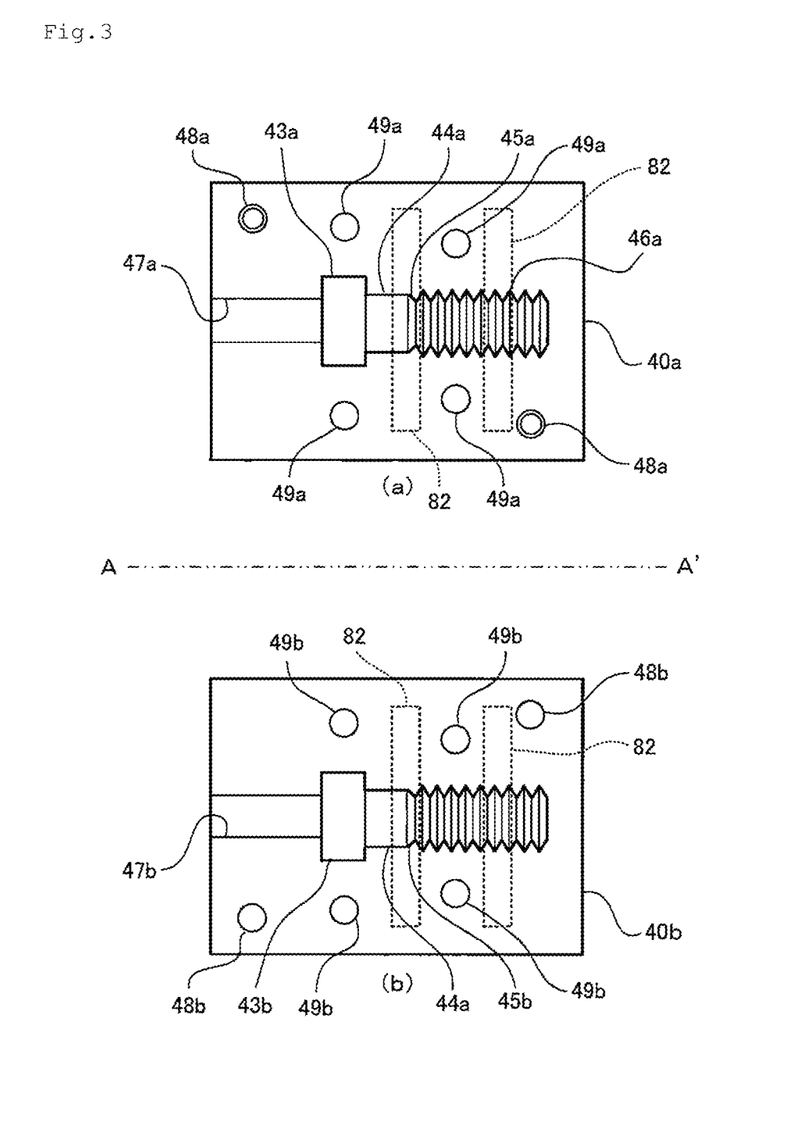
FIG. 3 is a schematic diagram showing a configuration of the die.

In FIG. 3, FIGS. 3(a) and 3(b) are line-symmetric with respect to a chain double-dashed line A-A'.

That is, as shown in FIG. 3(a), the die 40a has a die shape for forming a head part 43a, a cylindrical part 44a, an incomplete screw part 45a, and a screw part 46a of the bolt 1. Further, an insertion hole 47a, which is a hole for inserting an insertion part 51 of the insertion tool 50 for compressing the resin, is provided at one end of the die 40.

In the die 40b, a head part 43b, a cylindrical part 44b, an incomplete screw part 45b, a screw part 46b and an insertion hole 47b having the same shapes as those of the die 40a are formed at line-symmetric positions of the die 40b. Hereinafter, a hole formed by the insertion hole 47a and the insertion hole 47b is referred to as an insertion hole 47.

Further, the die 40a is provided with four through holes 49a for integrating the die 40a with the die 40b with the bolts 41 and the nuts 42 and two pins 48a for positioning at the time of integration.

The die 40b is provided with four through holes 49b and two holes 48b fitted with two pins 48a, respectively, at line-symmetric positions of the die 40a.

Furthermore, two (a total of four as the die 40) heaters 82 are embedded in the dies 40a and 40b, respectively, so that the die 40 can be heated by supplying power to the heaters 82 from the external.

The CFRP resin tape layer 10 is placed in the die 40, the halved dies 40 are integrated with the bolts 41 and the nuts 42, and the insertion tool 50 is inserted into the insertion hole 47 as shown in FIG. 4(a). The insertion tool 50 is made of a metal such as a SUS material, and includes the insertion part 51 having an outer diameter slightly smaller than the diameter of the insertion hole 47, and a columnar head part 52 provided at one end of the insertion part 51.

Then, as shown in FIG. 4(b), in a state where the insertion part 51 of the insertion tool 50 is inserted into the insertion hole 47, the die 40 is mounted on a bolster plate 80 of a pressing machine with the head part 52 up. The resin in the die 40 is pressurized by depressing the head part 52 with a slide 81 of the press machine, and then power is supplied to the heaters 82 so that the temperature of the die 40 (that is, the temperature of the resin, about 150° C. in the case of vinyl ester) is raised to the curing temperature of the resin, thereby curing the resin (curing step).

Figure 4:
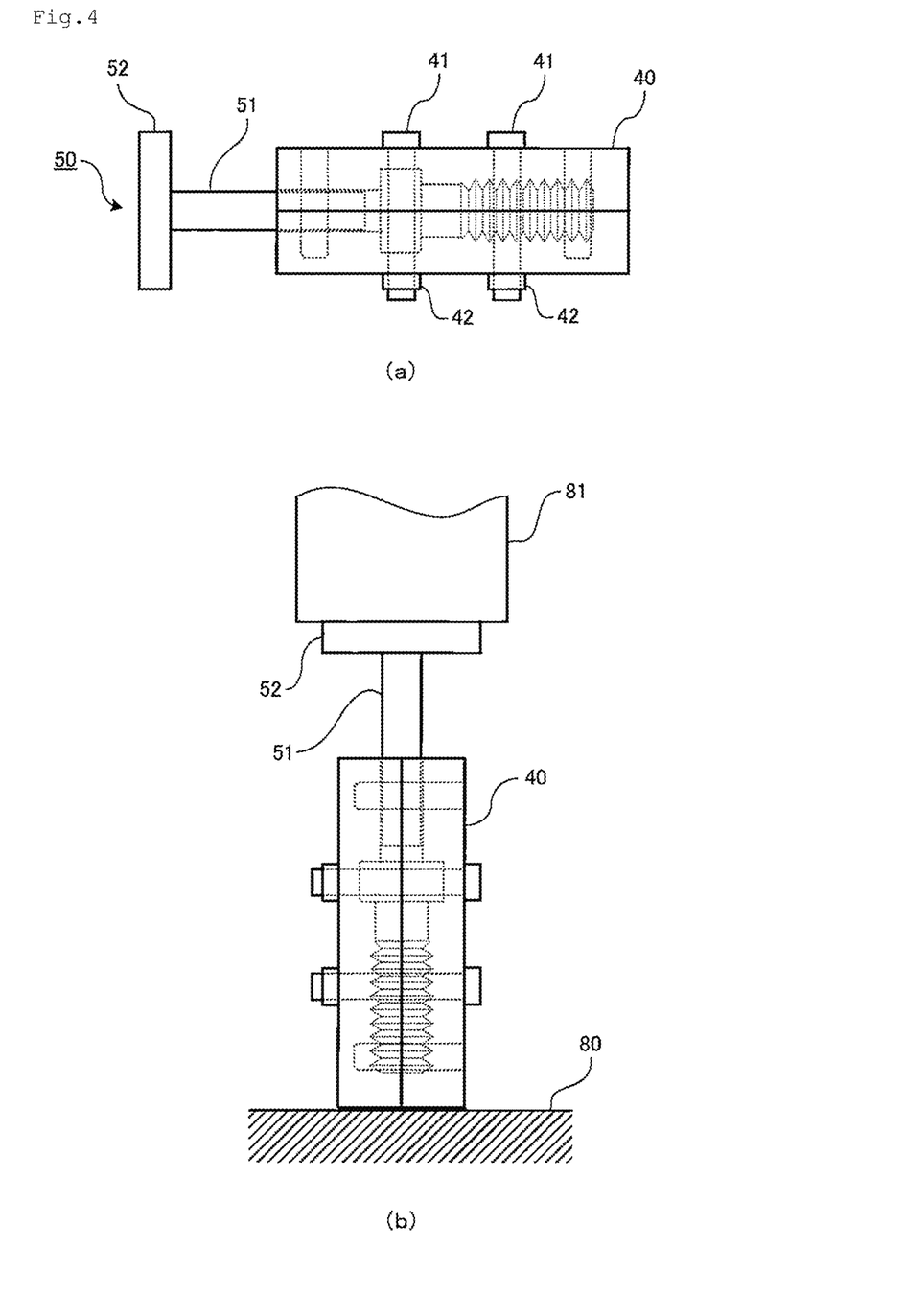
FIG. 4 is a schematic diagram showing a state where an insertion tool 50 is inserted into the die to pressurize a resin in the die.

After completion of the curing step, the power supply to the heaters 82 is stopped. The nuts 42 of the die 40 are loosened, the die 40 is disassembled, and the bolt 1 is removed from the die 40.

(Characteristics of Bolt 1)

The fiber-reinforced resin bolt 1 manufactured by such a manufacture method includes a resin layer 20, the screw part 30, a head part 31, a cylindrical part 32, and an incomplete screw part 33, as shown in FIG. 5(a). Further, the fiber-reinforced resin bolt 1 is formed such that the CFRP resin tape layer 10 formed in a ring shape by the winding step is pushed in the winding axis direction inside the die 40, by pressurization in the curing step, to be in a spiral shape.

Therefore, the fiber-reinforced resin bolt 1 has, inside the cured resin layer 20, a CFRP layer 70 wound spirally around the winding axis. FIG. 5(a) shows a cross-sectional photograph of the entire actual fiber-reinforced resin bolt 1, and FIG. 5(b) shows an enlarged cross-section photograph of the screw part 30 of the fiber-reinforced resin bolt 1.

As shown in FIGS. 5(a) and 5(b), it can be seen that the CFRP layer 70 is formed over the entire inside of the resin layer 20 of the fiber-reinforced resin bolt 1.

The CFRP 12 receives the axial tensile force and circumferential bending force applied to such a fiber-reinforced resin bolt 1. Since the CFRP layer 70 has a spiral shape, the CFRP 12 receives both the tensile force and the bending force.

Therefore, the fiber-reinforced resin bolt 1 can have a strength higher than that of a conventional bolt in which the reinforcing fiber is arranged only in the axial direction.

Further, in the fiber-reinforced resin bolt 1, CFRP (carbon fiber-reinforced plastic) is used as the reinforcing fiber 12. Thus, the fiber-reinforced resin bolt 1 can be lightweight and have a high strength.

Figure 6:
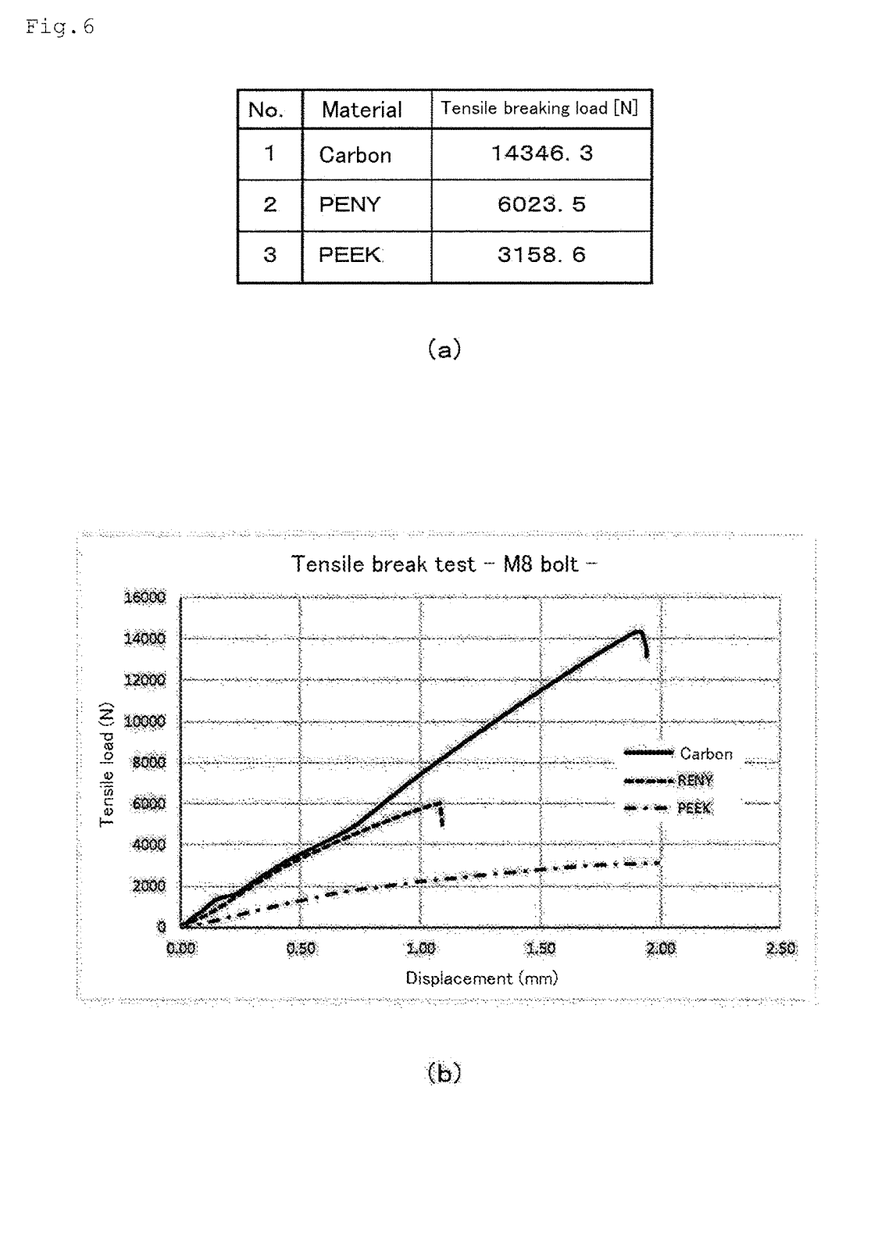
FIG. 6 is a view showing the results of a tensile break test on the fiber-reinforced resin bolt.

Here, FIG. 6 shows the results of a tensile break test performed on the fiber-reinforced resin bolt 1 of M8 size, a RENY (registered trademark) bolt (50% glass fiber-reinforced polyamide MXD6 bolt) and a PEEK bolt (polyetheretherketone bolt) by a test method in conformity with JIS B 1051. As described above, the fiber-reinforced resin bolt 1 includes 57% by weight of the CFRP 12 and 43% by weight of the thermosetting resin.

As shown in FIG. 6(a) and FIG. 6(b), the fiber-reinforced resin bolt 1 exhibits a tensile breaking load at which the bolt breaks of 14346.3 [N], and thus can have a tensile break strength which is about 2.4 times higher than the tensile breaking load, 6023.5 [N], of the conventional RENY bolt and about 4.5 times higher than the tensile breaking load, 3158.6 [N], of the conventional PEEK bolt.

Second Embodiment

Next, a second embodiment in which the carbon fiber content rate and resin content rate of the fiber-reinforced resin bolt 1 are changed will be described. The material and manufacture method for the fiber-reinforced resin bolt 1 in the second embodiment are the same as those for the fiber-reinforced bolt 1 in the first embodiment, and thus descriptions thereof will be omitted.

Figure 7:
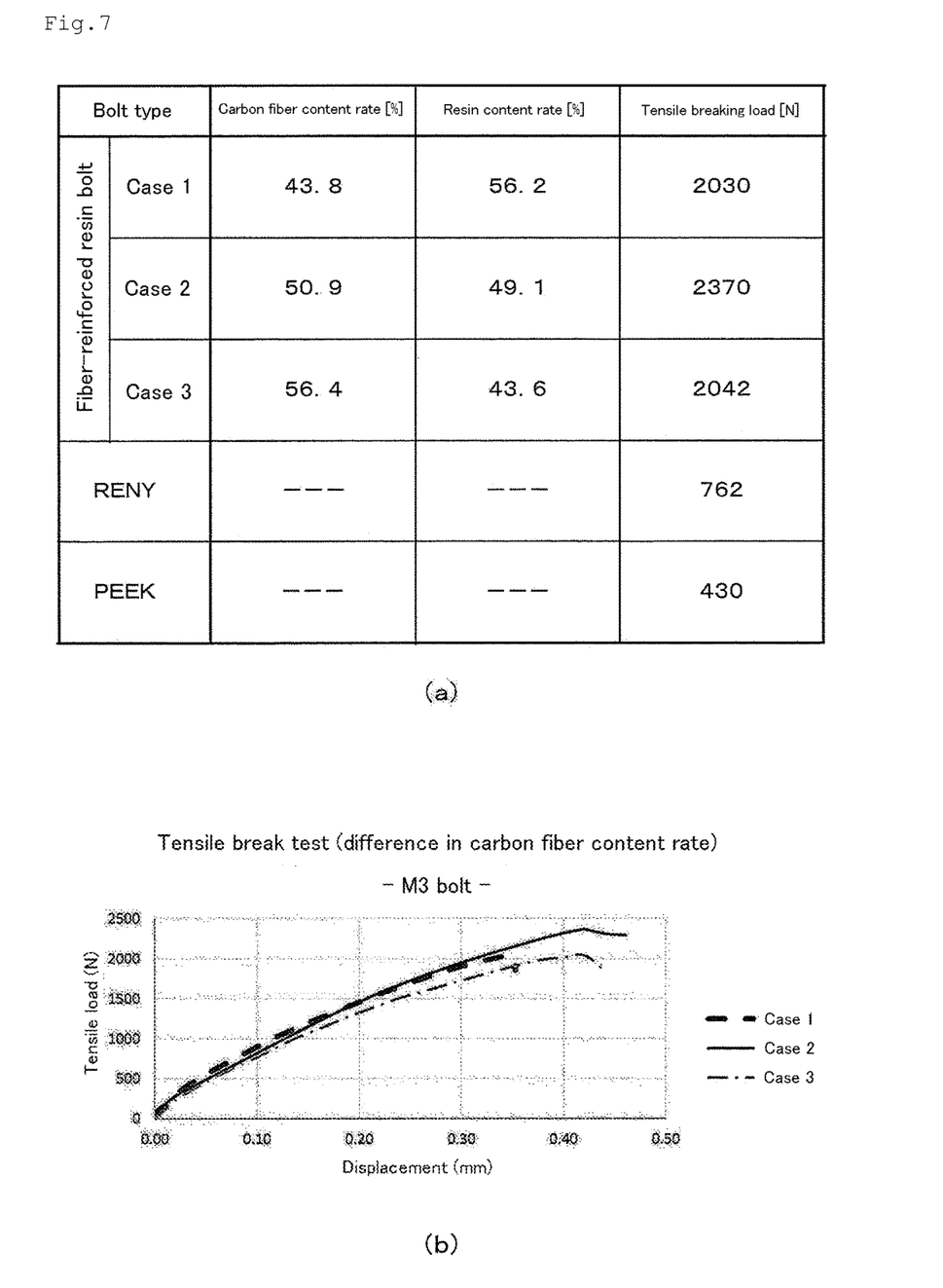
FIG. 7 is a view showing the results of a tensile break test on the fiber-reinforced resin bolt when the carbon fiber content rate and the resin content rate vary.

FIG. 7 shows the results of a tensile break test on the fiber-reinforced resin bolt 1 when the carbon fiber content rate and the resin content rate are changed. The tensile break test was performed by the test method in conformity with JIS B 1051, as in the case shown in FIG. 6.

The fiber-reinforced resin bolt 1 of M3 size was used as a test body to perform the tensile break test in the following three cases:
- Case No. 1: carbon fiber content rate: 43.8% and resin content rate: 56.2%
- Case No. 2: carbon fiber content rate: 50.9% and resin content rate: 49.1%
- Case No. 3: carbon fiber content rate: 56.4% and resin content rate: 43.6%, as shown in FIG. 7(*a*).

As shown in FIGS. 7(*a*) and 7(*b*), the tensile break strength of the fiber-reinforced resin bolt 1 is as follows: the tensile breaking load is 2030 [N] in Case No. 1, 2370 [N] in Case No. 2, and 2042 [N] in Case No. 3.

In contrast, the conventional M3 RENY bolt exhibits a tensile breaking load of 762 [N], and it can be seen that the fiber-reinforced resin bolt 1 has a tensile break strength which is about 2.7 to 3.1 times higher than that of the RENY bolt.

In addition, the conventional M3 PEEK bolt exhibits a tensile breaking load of 430 [N], and it can be seen that the fiber-reinforced resin bolt 1 has a tensile break strength which is about 4.7 to 5.5 times higher than that of the PEEK bolt.

From the above, it can be seen that a sufficient tensile break strength can be obtained even when the proportions of the CFRP 12 and the thermosetting resin are 40% to 60% by weight and 60% to 40% by weight, respectively.

Third Embodiment

Next, a third embodiment in which a bending step is added after the winding step in the first embodiment will be described.

(Winding Step)

In the winding step in the third embodiment, unlike the winding shape of the CFRP resin tape 14 in the first embodiment, the CFRP resin tape 14 is concentrically wound around the winding axis so as to have a diameter of several centimeters, thereby forming the ring-shaped CFRP resin tape layer 10.

Figure 8:
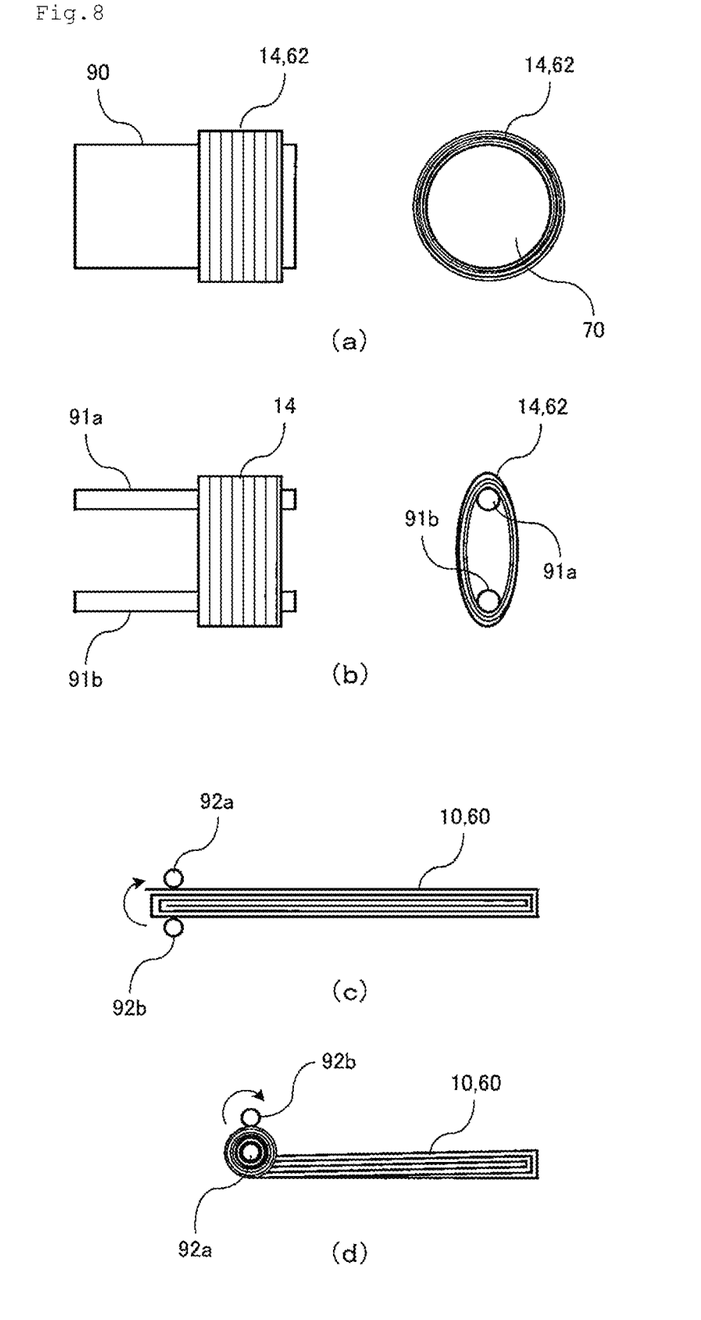
FIG. 8 is a conceptual diagram for explaining a method of winding a CFRP resin tape and a CFRP tape and a method of bending a CFRP resin tape layer and a CFRP tape layer in third and fifth embodiments.

As a winding method at this time, the CFRP resin tape 14 is wound around a columnar or cylindrical bar material 90 as shown in FIG. 8 (*a*) or two rod-shaped bar materials 91*a* and 91*b* arranged in parallel as shown in FIG. 8 (*b*).

(Bending Step)

In the bending step, as shown in FIG. 8(*c*), the ring-shaped CFRP resin tape layer 10 formed by the winding step is collapsed from the lateral direction into a band shape. The band-shaped CFRP resin tape layer 10 is pinched, at its one end, by two thin metal rods 92*a* and 92*b*, and wound concentrically around an axis of the metal rod 92*a* as shown by arrows in FIGS. 8(*c*) and 8(*d*). By doing so, it is possible to form the CFRP resin tape layer 10 having a larger number of layers.

(Curing Step)

The curing step in the third embodiment is the same as that in the first embodiment, and a description thereof will be omitted.

The fiber-reinforced resin bolt 1 manufactured by the manufacture method including the above-described steps has an improved strength (tensile breaking load) as a bolt because the CFRP layer 60 is further multilayered.

Furthermore, even if the diameter of the CFRP resin tape layer 10 to be formed by winding is increased in the winding step, the CFRP resin tape layer 10 having an appropriate diameter can be formed by the subsequent bending step. Therefore, the winding step can be facilitated.

Fourth Embodiment

Next, the fiber-reinforced resin bolt 1 using a CFRP tape 62 instead of the CFRP resin tape 14 will be described.

While the CFRP resin tape 14 is formed in a band shape by integrating the CFRP fiber with the predetermined amount of resin so that the CFRP fiber is oriented in the longitudinal direction, the CFRP tape 62 is formed by arranging long fibers of CFRP in such a manner that the fibers of CFRP are oriented in the longitudinal direction and bundling them, or forming a fiber bundle into a band shape with a small amount of resin.

(Winding Step)

The winding step in a fourth embodiment is the same as that in the first embodiment except that the CFRP tape layer 60 is formed using the CFRP tape 62 instead of forming the CFRP resin tape layer 10 using the CFRP resin tape 14, and a detailed description thereof will be omitted.

(Resin Injection Step)

After the CFRP tape layer 60 is placed in this die 40, the halved dies 40 are integrated with the bolts 41 and the nuts 42, and a thermosetting resin such as vinyl ester is injected into the die 40 from the insertion hole 47.

(Curing Step)

After injection of the resin into the die 40, the insertion tool 50 is inserted into the insertion hole 47 as in the first embodiment. In this state, the resin within the die 40 is pressurized by depressing the head part 52 with a slide 81 of the pressing machine, and, at the same time, power is supplied to the heaters 82 to heat the die 40, thereby curing the resin.

After completion of the curing step, the nuts 42 of the die 40 are loosened, the die 40 is disassembled, and the bolt 1 is removed from the die 40.

Figure 5:
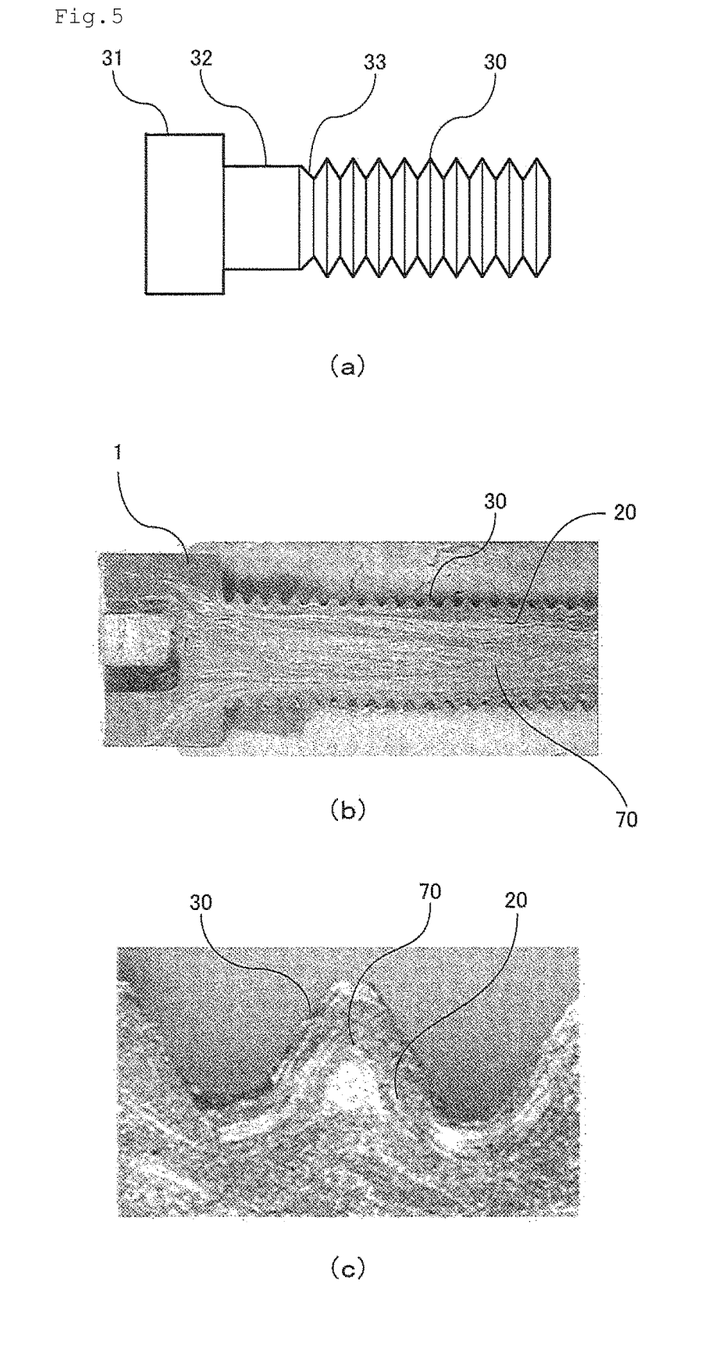
FIG. 5 is a cross-sectional photograph of a fiber-reinforced resin bolt.

The fiber-reinforced resin bolt 1 manufactured by such a manufacture method has similar structure and performance to those of the first embodiment (see FIGS. 5 and 6).

Fifth Embodiment

Next, a fifth embodiment will be described. The fifth embodiment is an embodiment in which a bending step is added to the fourth embodiment, similarly to the third embodiment (a bending step is added after the winding step in the first embodiment). In this case, the steps are the same as those of the third embodiment except that the CFRP tape 62 is used in place of the CFRP resin tape 14 used in the third embodiment, and thus a detailed description thereof is omitted (see FIG. 8).

The fiber-reinforced resin bolt 1 manufactured by the manufacture method according to the fifth embodiment has similar structure and performance as those of the fiber-reinforced resin bolt 1 manufactured by the manufacture method according to the third embodiment. Further, as is the case with the third embodiment, the winding step can be facilitated.

Other Embodiments (1) In the above embodiments, CFRP (carbon fiber-reinforced plastic) is used as the reinforcing fiber 12. However, instead of CFRP, an inorganic fiber-based reinforcing fiber such as glass fiber-reinforced plastic (GFRP) or an organic fiber-based reinforcing fiber such as aramid fiber-reinforced plastic (AFRP) may be used.

(2) In the above embodiments, a thermosetting resin such as vinyl ester is used as the resin. However, a thermoplastic resin such as PEEK (polyetheretherketone) or Teflon (registered trademark) may be used. In that case, it is not necessary to heat the die 40 up to the thermosetting temperature in the curing step.

(3) In the above embodiments, in the bending step of forming the CFRP resin tape layer 10 and the CFRP tape layer 60, the ring-shaped CFRP resin tape layer 10 and CFRP tape layer 60 are each collapsed from the lateral direction into a band shape, and wound concentrically around one end thereof as a central axis. However, the ring-shaped CFRP resin tape layer 10 and CFRP tape layer 60 may each be bent several times using the axis parallel to the winding axis as a bending axis. In other words, the CFRP resin tape layer 10 and the CFRP tape layer 60 may each be bent several times in a direction perpendicular to the orientation of the fibers of the CFRP 12.

(4) In the above embodiments, the inner surface shape of the die 40 is indicated as an example of the outer shape of the bolt 1. However, the shape is not limited to this, and may be any other shape such as a shape having no cylindrical part 32.

(5) In the above embodiments, the heaters 82 are used to heat the die 40. However, a method capable of heating the die 40 to the curing temperature of the thermosetting resin, for example, any other heating means of circulating a heated liquid inside the die 40, winding a nichrome wire around the die 40, or the like, may be used.

REFERENCE SIGNS LIST

1 Fiber-reinforced resin bolt (bolt)
10 Reinforcing fiber resin tape layer (CFRP resin tape layer)
12 Reinforcing fiber (CFRP)
14 Reinforcing fiber resin tape (CFRP resin tape)
20 Resin layer
30 Screw part
31 Head part
32 Cylindrical part
33 Incomplete screw part
40, 40a, 40b Die
41 Bolt
42 Nut
43, 43a, 43b Head part
44, 44a, 44b Cylindrical part
45, 45a, 45b Incomplete screw part
46, 46a, 46b Screw part
47 Insertion hole
48a Pin
48b Hole
49a, 49b Through hole
50 Insertion tool
51 Insertion part
52 Head part
60 Reinforcing fiber tape layer (CFRP tape layer)
62 Reinforcing fiber tape (CFRP tape)
70 Reinforcing fiber layer (CFRP layer)
80 Bolster plate
81 Slide
82 Heater
90, 91a, 91b Bar material
92a, 92b Metal rod

The invention claimed is:

1. A method for manufacturing a fiber-reinforced resin bolt, comprising forming a fiber-reinforced resin bolt (1) by:
a winding step of winding a reinforcing fiber resin tape (14), which is formed in a band shape by integrating a reinforcing fiber (12) of a single material with a resin in such a manner that the reinforcing fiber (12) is oriented in a longitudinal direction, so that the reinforcing fiber (12) is arranged concentrically around a winding axis, thereby forming a reinforcing fiber resin tape layer (10);
a curing step of placing the reinforcing fiber resin tape layer (10) formed by the winding step in a die (40) whose inner wall surface is formed with a screw shape, and pressurizing the reinforcing fiber resin tape layer (10) placed in the die (40) from one direction of the winding axis toward the other and heating, thereby curing the resin of the reinforcing fiber resin tape layer (10), to form the reinforcing fiber layer (70) wound spirally around the winding axis; and
after the winding step,
a bending step of bending the reinforcing fiber resin tape layer (10) formed by the winding step with respect to an axis parallel to the winding axis.

2. A method for manufacturing a fiber-reinforced resin bolt, comprising forming a fiber-reinforced resin bolt (1) by:
a winding step of winding a reinforcing fiber tape (62), which is formed in a band shape in such a manner that a reinforcing fiber (12) is oriented in a longitudinal direction, so that the reinforcing fiber (12) is arranged concentrically around a winding axis, thereby forming a reinforcing fiber tape layer (60);
a resin injection step of placing the reinforcing fiber tape layer (60) formed by the winding step in a die (40) whose inner wall surface is formed with a screw shape, and injecting a resin into the die (40) in which the reinforcing fiber tape layer (60) is placed;
a curing step of pressurizing the die (40) into which the resin is injected by the resin injection step from one direction of the winding axis toward the other and heating, thereby curing the resin containing the reinforcing fiber tape layer (60); and
after the winding step,
a bending step of bending the reinforcing fiber tape layer (60) formed by the winding step with respect to an axis parallel to the winding axis,
wherein the resin injection step includes placing the reinforcing fiber tape layer (60) formed by the bending step in the die (40) whose inner wall surface is formed with a screw shape, and injecting the resin into the die (40) in which the reinforcing fiber tape layer (60) is placed.

* * * * *